United States Patent [19]

Stuckey

[11] Patent Number: 4,534,129
[45] Date of Patent: Aug. 13, 1985

[54] PLANT SUPPORT

[76] Inventor: William C. Stuckey, 1503 Virginia St. E., Charleston, W. Va. 25311

[21] Appl. No.: 547,534

[22] Filed: Oct. 31, 1983

[51] Int. Cl.³ ............................................ A01G 17/06
[52] U.S. Cl. ...................................................... 47/47
[58] Field of Search ........................ 47/44, 45, 46, 47

[56] References Cited

U.S. PATENT DOCUMENTS 3,302,328  2/1967  King ........................................ 47/47
4,074,461  2/1978  Hirschman .............................. 47/47

FOREIGN PATENT DOCUMENTS 45338  7/1928  Norway .................................. 47/47

Primary Examiner—Robert A. Hafer
Assistant Examiner—Bradley M. Lewis
Attorney, Agent, or Firm—Jim Zegeer

[57] ABSTRACT

A plant support in which a wire loop plant support is adjustably supported in cantelever fashion from a post at fixed positions on the post by a post coupling structure including at least one terminal end of the wire being formed as a projection integral with the wire loop for piercing or otherwise entering the post and a reaction bearing member also integral with the wire loop but at a lower level than the integral projection so that downward acting plant loads on the cantelever plant support urge the reaction bearing member against the post and the projection into the post. The spacing between the sharp tip of the projection and the bearing member is sufficient to permit the integral post coupling structure to slide down the post to any selected position and, pivot to a horizontal loop position about the reaction bearing member. When in the preferred embodiment of the invention the post is wooden and cylindrical, the piercing projection enters the wood so that the wire loop can thereby be angularly oriented at any desired position relative to the axis of the post.

6 Claims, 10 Drawing Figures

PLANT SUPPORT

REFERENCE TO RELATED APPLICATIONS

This application is related to my application Ser. No. 519,659 for "Post and Cantelever Ring Plant/Vine Support Structure" and my application Ser. No. 519,658 for "Plant/Vine Support", both filed Aug. 2, 1983.

BACKGROUND OF THE INVENTION

Plant supports of the type having a post driven into the ground and one or more cantelevered plant support wire loop members supported at adjustable positions on the post are known in the art. While a number of prior art examples are referred to in my above identified patent applications, reference is especially made to U.S. Pat. No. 1,627,495, to Effley, as that patent discloses a plant support in which a hook is formed intergally on the center of the wire loop with the remote wire ends being twisted to form the hoop or loop. The present invention is an improvement over the type of plant support shown in U.S. Pat. No. 1,627,495, to Effley, in that it is easier to fabricate and a penetrating punch is formed on the end of the continuous wire loop so it can be used universally with wooden or synthetic dowels for penetrating same by piercing or for entering preformed holes in metal posts and the like. Loading on the loop through the moment arm thereof forces the punch or sharp piercing end of the projection tip more forcefully or firmly into the wood of the dowel. Rigid foams can be used in some cases where the load may be light. As noted, the rings or loops incorporating the invention can be used with metal posts in which the holes are formed for the receipt of the penetrating punch.

Accordingly, the object of the invention is to providan improved plant support system.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
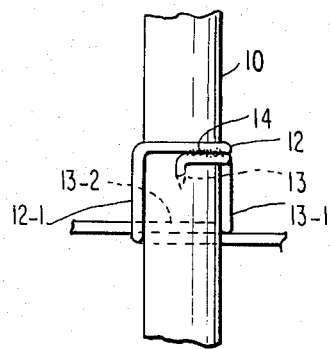
FIGS. 1a–1d are rear, side, front and plan views which disclose a preferred embodiment of the invention wherein a cylindrical wood dowel constitutes the post.
Figure 1B:
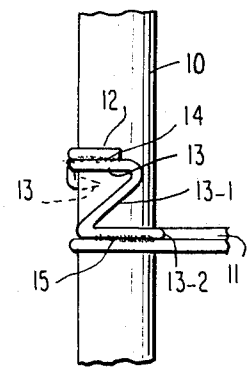
Figure 1C:
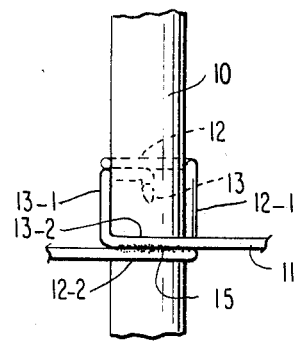
Figure 1D:
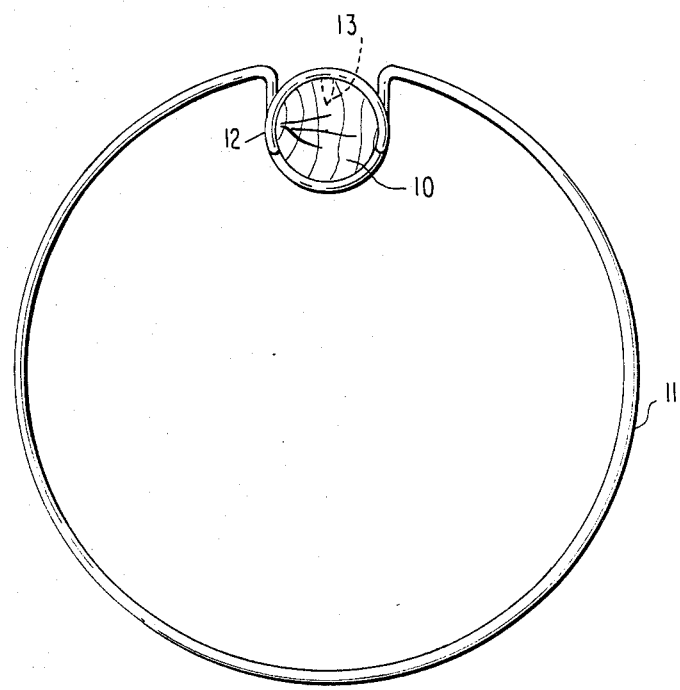
Figure 2A:
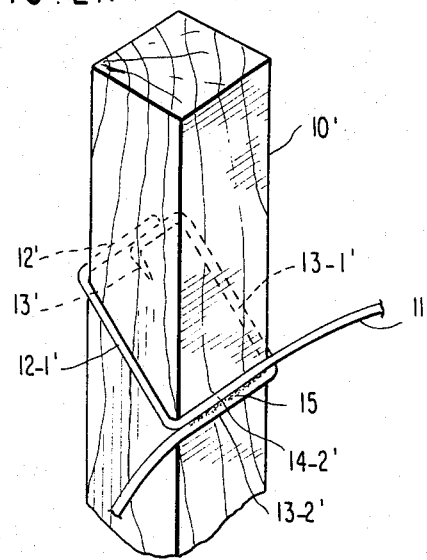
FIG. 2a is a second preferred embodiment of the invention wherein the post is a square or rectangular in cross section.
Figure 2B:
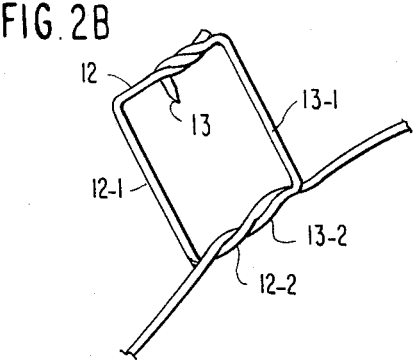
FIG. 2b is a modification of FIG. 2a wherein the reaction bearing member and ends of the wire are twisted together.

Referring now to FIGS. 1a–1d, a post 10 which in this embodiment is round or circular but could be square or rectangular as shown in FIG. 2, is adapted to be driven into the ground near the plant (not shown) which is to be supported. The intergal continuous wire plant support member 11 which is shown in the top plan view of FIG. 1d is a circular loop or ring but which could likewise be rectangular or any other shape and preferably, is made of high strength steel wire but could very easily be made of aluminum or plastic coated steel or aluminum wire, etc. Wire ring or loop 11 is made of a single intergal piece of wire which has its two opposing ends 12 and 13 (FIG. 1b) overlapping to a certain extent and welded, soldered, or otherwise fastened together as at 14. Piercing punch end 13 in this embodiment is sharpened to enable it to pierce and penetrate wooden post 10.

Figure 5:
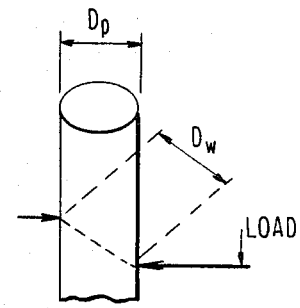
FIG. 5 illustrates the reaction force for maintaining or driving the tip projection into a wooden dowel and the spacing between the tip and the bearing member.

The wire ends 12 and 13 are linked by integral members 13-1 and 12-1 to reaction bearing cross pieces 13-2 and 12-1 which may be welded, brazed or soldered together at 15. As indicated in FIGS. 1b and 5, the distance $D_w$ between the sharpened tip 13 and the inner surface of reaction bearing cross pieces 13-2 and 12-2 is slightly larger than the diameter $D_p$ of post 10 so that the ring 11, with its end structure as just described, can be telescoped onto the post 10 and slid therealong to any position desired and then the tip 13 urged inwardly to pierce into the wood 10 and thereby position the supporting ring 11 along any point along the post 10. As shown in FIG. 2, the wire ring 11' has the end portions 13-2' and 12-2' crossing and welded as at 15' and connecting links 13-1' and 12-1' join together and one end (or both ends) projecting forwardly into a sharp point 13' for piercing the rear of the post element 10'. It will be appreciated that instead of welding the wire may be twisted as at the overlap area of 12-2' and 13-2' and at the overlap area between the rear portions 13-1 and 12-1 as indicated in FIG. B.

Figure 3:
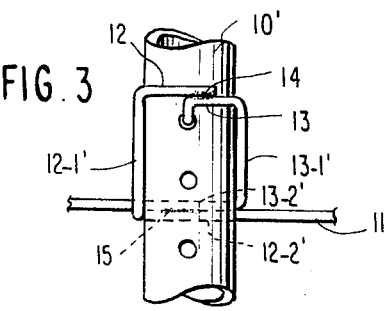
FIG. 3 is a further embodiment of the invention wherein a cylindrical or round pipe constitutes the post.
Figure 4A:
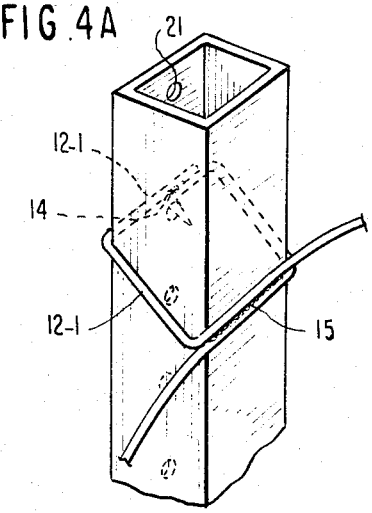
FIG. 4 is a further embodiment of the invention in which the post is a metal channel member.
Figure 4B:
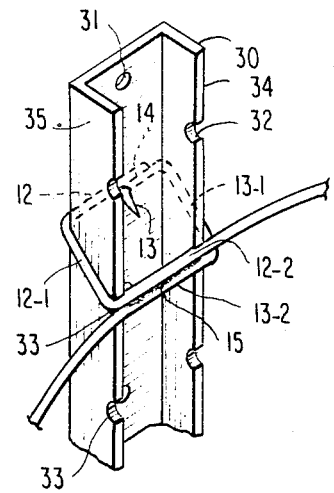

As shown in FIG. 4, a hollow rectangular post 20 can be utilized, in which case, a series of holes 21 is provided for the entry of the piercing end 13' of the wire shown in FIG. 3 can be utilized. Alternatively, as shown in FIG. 4, a channel member 30 serves as a post in which case, a series of holes 31 is formed in the base of the "U" of the U-shaped channel member and a series of the notches 32,33 is formed in legs 34,35 of the U-shaped member to facilitate positioning and locking of the ring on the post 30. Again, locking the ring in a fixed position on the post in this case is the same as the ring structure shown in FIG. 3.

Thus, the plant support according to the present invention is widely adaptable and flexible in terms of accomodating many different kinds of supporting posts both wooden and metal and even plastic materials, it is simple to use and easy to manufacture, stacks substantially flat, and in the embodiment shown in FIG. 1, the mounting or foam structure is internal of the loop. When used with a cylindrical wooden post or dowel it is universally adjustable to any angular position on the cylindrical post and at any desired height.

It will be appreciated that many other variations and adaptations will become apparent to those skilled in the art and it is intended that such apparent and obvious modifications that will be obvious to those skilled in the art are encompassed hereto.

What is claimed is:

1. A wire plant support for use with a post in the ground comprising, in combination, a plant support wire loop having a pair of terminal ends, at least a first one of said terminal ends of said wire loop being formed as a projection for entering said post, means for permanently securing a second terminal end of said wire to said first one of said terminal ends near said projection to prevent movement relative to each other, a pair of reaction bearing cross pieces near each end of said wire and integral therewith, each of said reaction bearing cross pieces being below the level of the point of entry of said post by said projection, said pair of reaction bearing cross pieces being secured together to prevent movement relative to each other, integral link members maintaining the spaced relation between said reaction bearing members and the point of entry of said post by said projection, said means securing said second terminal end of said wire to said first one of said terminal ends with the spacing between the tip of said projection and said pair of reaction bearing cross pieces being sufficient to permit the tip of said end and said reaction bearing members to be slid over said post to a desired position with said wire loop at an angle to the horizontal and then pivoted about said reaction bearing cross pieces to cause entry of said projection into said post with said wire loop in a substantially horizontal position.

2. The invention defined in claim 1 wherein said projection is sharpened and including a wooden post adapted to be driven into the ground adjacent a plant and piercable by said sharp projection.

3. The invention defined in claim 2 wherein said wooden post is cylindrical.

4. The invention defined in claim 1 wherein said tip is sharpened and said post is cylindrical and of a material piercable by the tip of sharpened projection, whereby said plant wire support is universally adjustable thereon.

5. The invention defined in claim 1 including a steel post, said steel post having a flat vertical portion and a plurality of spaced apertures along said flat vertical portion for entry therein of said projection.

6. A wire plant support for use with a post comprising, in combination, a metal post, a plurality of vertically aligned perforations on said post, a plant support wire loop having a pair of terminal ends, at least a first one of said terminal ends of said wire loop being formed as a projection for entering one of said perforations on said post, means for securing a second terminal end of said wire to said first one of said terminal ends near said projection, a pair of spaced apart reaction bearing cross pieces near each end of said wire and integral therewith, said reaction bearing cross pieces straddling a post and being below the level of the point of entry of said post by said at least one terminal end and being secured together to prevent movement relative to each other, a pair of integral link members maintaining the spaced relation between said reaction bearing members and the point of entry of said post by said projection into said post, said means securing said second terminal end of said wire to said first one of said terminal ends being such that the spacing between the tip of said projection and said pair of reaction bearing cross pieces is sufficient to permit said tip of said projection and said reaction bearing members to be slid over said post to a desired one of said perforations with said wire loop at an angle to the horizontal and then pivoted about said reaction bearing cross pieces to cause entry of said projection into one of said perforations in said post with said wire loop in a substantially horizontal position.

* * * * *